United States Patent [19]

Seitz

[11] Patent Number: 4,647,286
[45] Date of Patent: Mar. 3, 1987

[54] REACTIVE DISAZO DYES AND THEIR USE: CONTAINING TWO 2,4-DIFLUORO-5-CHLORO-PYRIMIDYL RESIDUES

[75] Inventor: Karl Seitz, Oberwil, Switzerland

[73] Assignee: Ciba-Geigy Corporation, Ardsley, N.Y.

[21] Appl. No.: 767,658

[22] Filed: Aug. 20, 1985

Related U.S. Application Data

[63] Continuation of Ser. No. 618,154, Jun. 7, 1984, abandoned.

[30] Foreign Application Priority Data

Jun. 14, 1983 [CH] Switzerland ............ 3251/83

[51] Int. Cl.$^4$ .......................... C09B 62/25; D06P 3/66
[52] U.S. Cl. ............................................ 8/549; 8/681; 8/687; 8/689; 8/918; 534/600; 534/617; 534/632; 534/634; 534/637; 534/638; 534/670
[58] Field of Search .................. 8/689, 549, 681; 534/632, 634, 637, 638, 600

[56] References Cited

U.S. PATENT DOCUMENTS

| | | | |
|---|---|---|---|
| 3,694,444 | 9/1972 | Klauke et al. | 544/334 |
| 4,523,925 | 6/1985 | Scheibli | 8/549 |
| 4,602,915 | 7/1986 | Wolff et al. | 8/527 |

FOREIGN PATENT DOCUMENTS

| | | |
|---|---|---|
| 2817697 | 10/1979 | Fed. Rep. of Germany . |
| 1169254 | 11/1969 | United Kingdom . |
| 1273914 | 5/1972 | United Kingdom . |

*Primary Examiner*—A. Lionel Clingman
*Attorney, Agent, or Firm*—Edward McC. Roberts; Meredith C. Findlay

[57] ABSTRACT

Reactive dyes of the formula

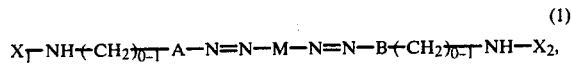

(1)

in which M is twice-coupled 1-amino-8-hydroxynaphthalene-3,6-disulfonic acid, 1-amino-8-hydroxynaphthalene-4,6-disulfonic acid, 1-amino-8-hydroxynaphthalene-4-sulfonic acid or 2-amino-5-hydroxynaphthalene-7-sulfonic acid, A and B, independently of each other, are each sulfophenylene or sulfonaphthylene which can be further substituted, and $X_1$ and $X_2$ are each a 2,4-difluoro-5-chloropyrimid-6-yl radical, subject to the condition that A and B together contain at least 3 sulfo groups, are particularly suitable for dyeing and printing cellulose-containing fibre materials and produce, in high dyeing yield, dyeings and prints having good fastness properties.

9 Claims, No Drawings

REACTIVE DISAZO DYES AND THEIR USE: CONTAINING TWO 2,4-DIFLUORO-5-CHLORO-PYRIMIDYL RESIDUES

This application is a continuation of application Ser. No. 618,154, filed June 7, 1984, now abandoned.

The present invention relates to novel reactive dyes, to a process for their preparation, and to their use for dyeing or printing fibre materials.

The practice of dyeing with reactive dyes has in recent years led to raised demands on the quality of the dyeings and the economics of the dyeing process. Consequently there continues to be a need for new reactive dyes which have improved properties, in particular improved application properties.

The cold pad-batch dyeing of cotton these days requires reactive dyes which are sufficiently substantive at the low dyeing temperature and which also have good washing-off properties. They should furthermore be highly reactive, so that residence times need not be long, and should in particular produce dyeings having high degrees of fixation. Existing dyes meet these requirements only to an insufficient degree.

It is therefore the object of the present invention to provide new, improved reactive dyes for the cold pad-batch process which have the qualities described above to a high degree. The new dyes should be distinguished especially by high yields of fixation and high fibre-dye bond stabilities, and, moreover, the unfixed portions on the fibre shall be easy to wash off. Furthermore, they shall produce dyeings having good allround fastness properties, for example light and wet fastness properties.

This object is achieved with the novel bireactive dyes defined hereinafter.

The invention accordingly provides reactive dyes of the formula

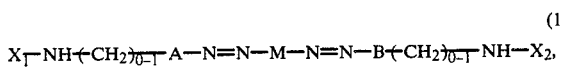

(1)

in which M is twice-coupled 1-amino-8-hydroxynaphthalene-3,6-disulfonic acid, 1-amino-8-hydroxynaphthalene-4,6-disulfonic acid, 1-amino-8-hydroxynaphthalene-4-sulfonic acid or 2-amino-5-hydroxynaphthalene-7-sulfonic acid, A and B, independently of each other, are each sulfophenylene or sulfonaphthylene which can be further substituted, and $X_1$ and $X_2$ are each a 2,4-difluoro-5-chloropyrimid-6-yl radical, subject to the condition that A and B together contain a least 3 sulfo groups.

The A and B radicals in the formula (1) can be further substituted, for example by alkyl groups having 1 to 4 carbon atoms, such as methyl, ethyl, propyl, isopropyl or butyl, alkoxy groups having 1 to 4 carbon atoms, such as methoxy, ethoxy, propoxy, isopropoxy or butoxy, alkanoylamino groups having 1 to 4 carbon atoms, such as acetylamino or propionylamino, alkoxycarbonyl having 1 to 4 carbon atoms in the alkoxy radical, such as methoxycarbonyl or ethoxycarbonyl, alkylsulfonyl having 1 to 4 carbon atoms, such as methylsulfonyl or ethylsulfonyl, trifluoromethyl, nitro, cyano, halogen, such as fluorine, chlorine or bromine, carbamoyl, N-alkylcarbamoyl having 1 to 4 carbon atoms in the alkyl radical, such as N-methylcarbamoyl or N-ethylcarbamoyl, sulfamoyl, N-alkylsulfamoyl having 1 to 4 carbon atoms, such as N-methylsulfamoyl, N-ethylsulfamoyl, N-propylsulfamoyl, N-isopropylsulfamoyl or N-butylsulfamoyl, ureido, hydroxyl, carboxyl, sulfomethyl or sulfo. Methyl, ethyl, methoxy, ethoxy, acetylamine, chlorine, bromine, ureido, hydroxyl, carboxyl, sulfomethyl and in particular sulfo are preferred substituents.

Preference goes to:
reactive dyes of the formula

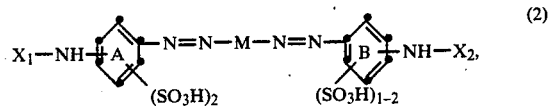

(2)

in which M, $X_1$ and $X_2$ are as defined under the formula (1), and the benzene rings A and B, independently of each other, can be further substituted;
reactive dyes of the formula (2) in which the benzene rings A and B are not further substituted;
reactive dyes of the formula

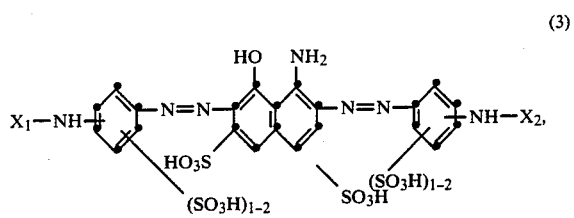

(3)

in which $X_1$ and $X_2$ are as defined for the formula (1) and the total number of sulfo groups is 5 or 6;
reactive dyes of the formula

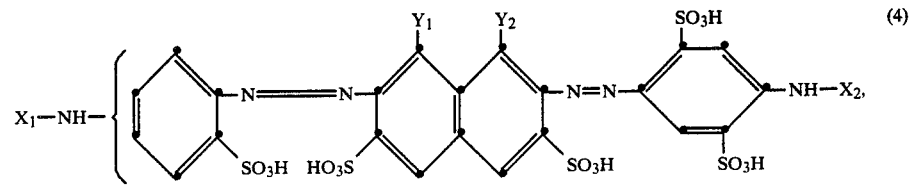

(4)

in which one Y is OH while the other Y is $NH_2$, and $X_1$ and $X_2$ are as defined for the formula (1); and the reactive dye of the formula

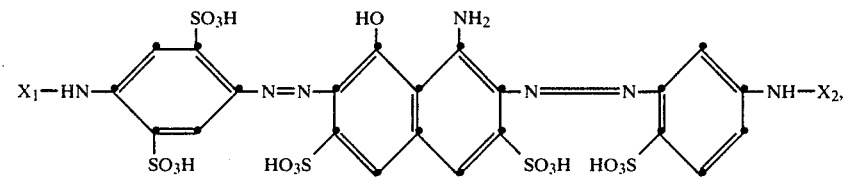

(5)

in which $X_1$ and $X_2$ are as defined for the formula (1).

The process for preparing the reactive dyes of the formula (1) comprises reacting diazo components of the formulae $$H_2N\text{—}A\text{—}(CH_2)_{0-T}Z_1 \qquad (6)$$

and $$H_2N\text{—}B\text{—}(CH_2)_{0-T}Z_2, \qquad (7)$$

in which $Z_1$ and $Z_2$, independently of each other, are each $NH_2$, acetylamino or nitro, the coupling component 1-amino-8-hydroxynaphthalene-3,6-disulfonic acid, 1-amino-8-hydroxynaphthalene-4,6-disulfonic acid, 1-amino-8-hydroxynaphthalene-4-sulfonic acid or 2-amino-5-hydroxynaphthalene-7-sulfonic acid, and 2 equivalents of 2,4,6-trifluoro-5-chloropyrimidine by diazotising, coupling and condensing them in suitable order to give reactive dyes of the formula (1) in such a way that, if $Z_1$ or $Z_2$ is acetylamino or nitro, it is converted into the $NH_2$ group, by hydrolysis in the case of the acetylamino group or reduction in the case of the nitro group, before condensation with the halogenopyrimidine.

Since the individual process steps given above can be carried out in different orders and in some cases, if desired, even simultaneously, there are a number of possible variants of the process. The starting materials to be used in each sub-reaction follow from the formula (1). In general, the overall reaction is carried out in successive steps in which the order of the simple reactions between the individual components is subject to certain restrictions. For one, the coupling onto the central component M, which is carried out in acid solution and is into the ortho-position relative to the $NH_2$ group, has to be carried out first, since a preceding coupling in neutral or alkaline solution, and into the ortho-position relative to the OH group, prevents any subsequent coupling into the ortho-position relative to the amino group. As, for another, hydrolysis of the 2,4-difluoro-5-chloropyrimidine radical takes place under certain conditions, an intermediate which contains acetylamino groups (see hereinafter) must be hydrolysed (to split off the acetyl groups) before it is condensed with a 2,4,6-trifluoro-5-chloropyrimidine.

In important variants of the process, 1. 2,4,6-trifluoro-5-chloropyrimidine and a diaminobenzenesulfonic acid are condensed, the resulting primary condensation product is diazotised and coupled onto 1-amino-8-hydroxynaphthalene-3,6-disulfonic acid under acid conditions, a further equivalent of 2,4,6-trifluoro-5-chloropyrimidine is condensed with a diaminobenzenesulfonic acid, the condensation product is diazotised, and the second diazonium compound obtained is coupled onto the monoazo compound prepared first in neutral or alkaline solution.

2. 2 moles of an aminoacetylaminobenzenesulfonic acid or two different aminoacetylaminobenzenesulfonic acids are coupled onto 1-amino-8-hydroxynaphthalene-3,6-disulfonic acid under acid conditions and alkaline conditions, the resulting disazo dye is hydrolysed, and the resulting diaminodisazo dye is condensed with 2 equivalents of 2,4,6-trifluoro-5-chloropyrimidine. Instead of using an aminoacetylaminobenzenesulfonic acid it is also possible to use as the diazo component(s) an aminonitrobenzenesulfonic acid or two different aminonitrobenzenesulfonic acids, to convert the nitro groups in the resulting dinitrodisazo dye into amino groups by reduction, for example with sodium sulfide or sodium sulfhydrate, and to treat the resulting diaminodisazo dye further as described above.

3. an aminoacetylaminobenzenesulfonic acid is diazotised and coupled onto 1-amino-8-hydroxynaphthalene-3,6-disulfonic acid under acid conditions, and the acetyl group is eliminated out of the resulting o-aminoazo compound by hydrolysis; furthermore, 2,4,6-trifluoro-5-chloropyrimidine and a diaminobenzenesulfonic acid are condensed with each other, the primary condensation product is diazotised and is coupled onto the monoazo compound prepared first, and the free, acylatable amino group in the radical of the first diazo component is then condensed with 2,4,6-trifluoro-5-chloropyrimidine. In this variant too, it is possible to use as diazo component an aminonitrobenzenesulfonic acid, in place of the aminoacetylaminobenzenesulfonic acid, to reduce the nitro-o-aminoazo compound, and then to conduct the further coupling as above.

In the above elucidation of the most important variants of the process, the twice-couplable coupling component was always 1-amino-8-hydroxynaphthalene-3,6-disulfonic acid and the acylatable diazo component ws always a diaminobenzenesulfonic acid or an aminoacetylaminobenzenesulfonic acid. In their place it is of course also possible to use other components meeting the definition for the M, A and B radicals in the formula (1), for example 1-amino-8-hydroxynaphthalene-4,6-disulfonic acid as a coupling component, and differently substituted diaminobenzenes, such as 1,4-diaminobenzene-2,5-disulfonic acid, or diaminonaphthalenes, such as 2,6-diaminonaphthalene-4,8-disulfonic acid, as diazo components.

Hereinafter are mentioned specific examples of possible starting materials which can be used for preparing the reactive dyes of the formula (1).

Diazo components of the formulae (6) and (7)

2,6-Diaminonaphthalene-4,8-disulfonic acid, 1,4-diaminobenlzene-2-sulfonic acid, 1,4-diaminobenzene-2,5-disulfonic acid, 1,4-diaminobenzene-2,6-disulfonic acid, 1,3-diaminobenlzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenlzene-4-sulfonic acid, 3-(3'- or 4'-aminobenzoylamino)-1-aminobenzene-6-sulfonic acid, 1-(4'-aminobenzoylamino)-4-aminobenzene-2,5-disulfonic acid, 4,4'-diaminodiphenylurea-2,2'-disulfonic acid, 4,4'-diaminodiphenyloxyethane-2,2'-disulfonic acid, 4,4'-diaminostilbene-2,2'-disulfonic acid and 4,4'-diaminodiphenylethane-2,2'-disulfonic acid.

If the diazo component used is, in place of a diamine, an aminoacetylamino compound from which the acetyl group is split off again afterwards by hydrolysis, as described above in elucidating the variants of the process and as is envisaged in the formulae (6) and (7), the monoacetyl compounds of the abovementioned diazo components, for example 1-acetylamino-3-aminobenzene-4-sulfonic acid or 1-acetylamino-4-aminobenzene-3-sulfonic acid, are suitable for this purpose.

According to the formula (1), the amino group which bonds the 2,4-difluoro-5-chloropyrimid-6-yl radical $X_1$ to the radical A can be bonded to A directly or by way of a —CH$_2$— group; the same is true of $X_2$ and B. In the case of a bond via —CH$_2$—, the diazo component used is a compound which, in addition to the amino group to be diazotised, can contain an acylatable aminomethyl group, for example 2-amino-5-aminomethylnaphthalene-1-sulfonic acid, 2-amino-5-aminomethylnaphthalene-1,7-disulfonic acid or 1-amino-4-methoxy-5-aminomethylbenzene-6-sulfonic acid.

Coupling components
1-Amino-8-hydroxynaphthalene-3,6-disulfonic acid, 1-amino-8-hydroxynaphthalene-4,6-disulfonic acid, 1-amino-8-hydroxynaphthalene-4-sulfonic acid and 2-amino-5-hydroxynaphthalene-7-sulfonic acid.

Reactive component
2,4,6-Trifluoro-5-chloropyrimidine.

The diazo components of the formulae (6) and (7) or the intermediates containing a diazotisable amino group are generally diazotised at low temperatures in aqueous mineral acid solution by action of nitrous acid. The first coupling onto the coupling component M takes place at acid or strongly acid pH, while the second coupling takes place at weakly acid, neutral or weakly alkaline pH.

The condensations of 2,4,6-trifluoro-5-chloropyrimidine with the diazo components of the formulae (6) and (7) or with the acylatable monoazo or disazo intermediates preferably take place at low temperatures and at weakly acid, neutral or weakly alkaline pH in aqueous solution or suspension. The hydrogen fluoride set free in the course of the condensation is advantageously continuously neutralised by adding aqueous alkali metal hydroxides, carbonates or bicarbonates.

The disazo dyes of the formula (1) are fibre-(bi)-reactive since they contain a detachable fluorine atom bonded to each of the two pyrimidine rings.

Fibre-reactive compounds are to be understood as meaning those capable of reacting with the hydroxyl groups of cellulose or with the amino groups of natural or synthetic polyamides to form covalent chemical bonds.

The reactive dyes of the formula (1) are suitable for dyeing and printing a very wide variety of materials, such as silk, leather, wool, nylon fibres and polyurethanes and in particular cellulose-containing fibre materials of any type. Examples of such fibre materials are the natural cellulose fibres, such as cotton, linen and hemp, and viscose and regenerated cellulose. The reactive dyes of the formula (1) are also suitable for dyeing or printing hydroxyl-group-containing fibres contained in blend fabrics, for example blends of cotton with polyester fibres or nylon fibres.

The dyes according to the invention are variously applied to the fibre material and fixed on the fibre, in particular in the form of aqueous dye solutions and print pastes. They are suitable not only for the exhaust dyeing method but also for the pad-dyeing method, in which the goods are impregnated with aqueous dye solutions with or without salt content, and the dyes are fixed with or without applied heat after a treatment with alkali or in the presence of alkali. They are particularly suitable for the so-called cold pad-batch process whereby the dye is applied on a pad-mangle together with the alkali and is afterwards fixed by leaving the dyeing to stand at room temperature for several hours. After the fixing operation the dyeings or prints are thoroughly rinsed with cold and hot water which can contain an added agent acting as a dispersant and promoting the diffusion of the unfixed portions.

The reactive dyes of the formula (1) are distinguished by high reactivity and good fixing properties. They can therefore be used for exhaust dyeing at low dyeing temperatures and require only short steaming times in the pad-steam method. The degrees of fixation are high, the unfixed portions are easily washed off, and the difference between the degree of exhaustion and the degree of fixation is remarkably small, i.e. the hydrolysis loss is very small. The reactive dyes of the formula (1) are also particularly suitable for printing, especially for printing cotton, as well as for printing nitrogen-containing fibres, for example wool, silk or blend fabrics containing wool.

The dyeings and prints prepared on cellulose fibre materials using the dyes according to the invention are of high tinctorial strength and have a high fibre-dye bond stability not only in the acid but also in the alkaline range, good light fastness and very good wet fastness properties, such as wash, water, seawater, cross-dyeing and perspiration fastness properties, as well as good fastness to pleating, hot-press fastness and rub fastness.

The following Examples serve to illustrate the invention. The temperatures are given in degrees centigrade. The parts and percentages are by weight, unless otherwise stated. Parts by weight relate to parts by volume as the kilogram relates to the liter.

The preparation of the monoazo or disazo intermediate compounds has not been described in all cases in the following illustrative embodiments, but it will be readily apparent from the general description.

EXAMPLE 1

104.4 parts of 2,4,6-trifluoro-5-chloropyrimidine are added dropwise at 10° C. to a neutral solution of 75.2 parts of m-phenylenediaminesulfonic acid in 1500 parts of water in the course of 2 hours. After all of the acylating agent has been added stirring is continued for a further 3 hours. Thereupon the reaction mixture is brought to pH 7 with 2N sodium hydroxide solution, and the condensation product of the formula

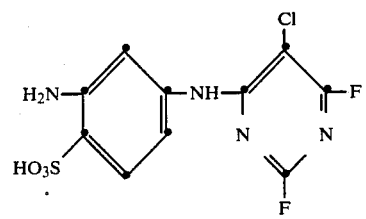

is isolated by sprinkling in 10% by volume of sodium chloride.

104 g of 2,4,6-trifluoro-5-chloropyrimidine are added dropwise at room temperature to a neutral solution of 107.2 parts of 1,4-phenylenediamine-2,5-disulfonic acid in 2000 parts of water in the course of 3 hours during which the reaction mixture is held at pH 7 by adding 2N sodium hydroxide solution at the same time. After clarification the condensation product of the formula

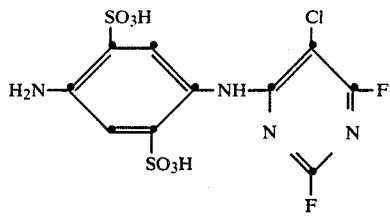

is isolated by adding 25% by volume of sodium chloride.

13.46 parts of the above-described condensation product of m-phenylenediaminesulfonic acid and 2,4,6-trifluoro-5-chloropyrimidine are diazotised in conventional manner. To the resulting suspension of the yellow diazo compound is then added a fine suspension of 12.76 parts of 1-amino-8-hydroxynaphthalene-3,6-disulfonic acid, and the coupling mixture is held at pH 2-3 by the dropwise addition of 1N sodium hydroxide solution.

The next day the resulting solution of the monoazo dye is brought to pH 7, 12 parts of sodium bicarbonate are added, as is the conventionally prepared diazonium salt of 16.66 parts of the condensation product of 1,4-phenylenediamine-2,5-disulfonic acid and 2,4,6-trifluoro-5-chloropyrimidine.

When the coupling has ended the dye is salted out with sodium chloride, is filtered off, and is dried in vacuo. The dye thus obtained has the following formula

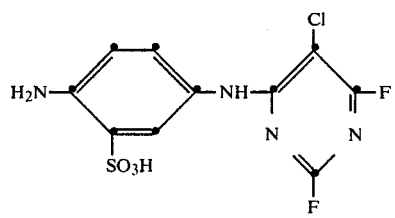

is salted out with sodium chloride.

107.2 parts of 1,3-phenylenediamine-4,6-disulfonic acid are suspended in 400 parts of water, and the suspension is brought to pH 5.5 by adding sodium hydroxide solution. The resulting solution is heated to 35° to 40° C., and 105 parts of 2,4,6-trifluoro-5-chloropyrimidine are added dropwise in the course of an hour during which pH 5.5 is maintained by the simultaneous addition of 2N sodium hydroxide solution. As soon as sodium hydroxide solution is not consumed any longer, the resultant condensation product of the formula

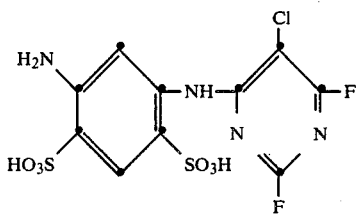

is salted out with potassium chloride and filtered off.

13.46 parts of the above-described condensation product of p-phenylenediaminesulfonic acid and 2,4,6-trifluoro-5-chloropyrimidine are diazotised in conventional manner. To the resulting suspension of the yellow diazo compound is then added a fine suspension of 12.76

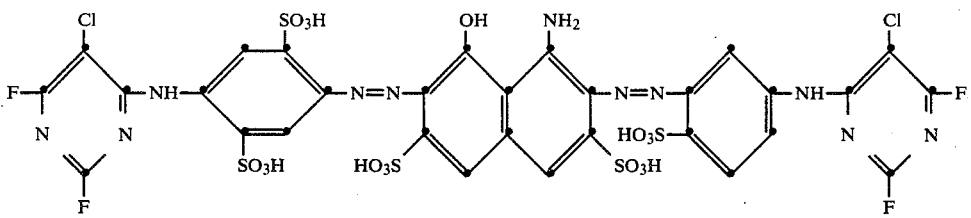

and dyes cotton in navy shades.

EXAMPLE 2

105 parts of 2,4,6-trifluoro-5-chloropyrimidine are added dropwise at 10° C. to a neutral solution of 75.2 parts of p-phenylenediaminesulfonic acid in 800 parts of water in the course of 1 to 2 hours. Stirring is then continued for about a further 3 hours, and the precipitated condensation product is filtered off.

To purify it, the filter residue is dissolved under neutral conditions and is decoloured with active charcoal, and the condensation product of the formula parts of 1-amino-8-hydroxynaphthalene-3,6-disulfonic acid, and the coupling mixture is held at pH 2-3 by the dropwise addition of 1N sodium hydroxide solution.

The next day the resulting solution of the monoazo dye is brought to pH 7 and 12 parts of sodium bicarbonate are added, as is the conventionally prepared diazonium salt of 16.66 parts of the condensation product of 1,3-phenylenediamine-4,6-disulfonic acid and 2,4,6-trifluoro-5-chloropyrimidine.

The dye thus obtained has the following formula

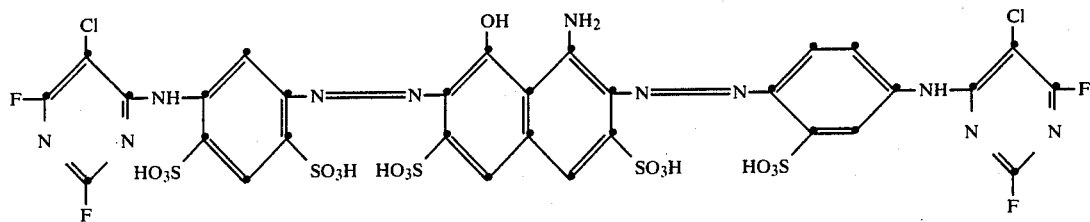
and dyes cotton in greenish navy shades.
Further useful dyes which dye cotton in navy shades are obtained using the condensation products of columns I and II, described in Examples 1 and 2, as diazo components and the coupling components of column III.
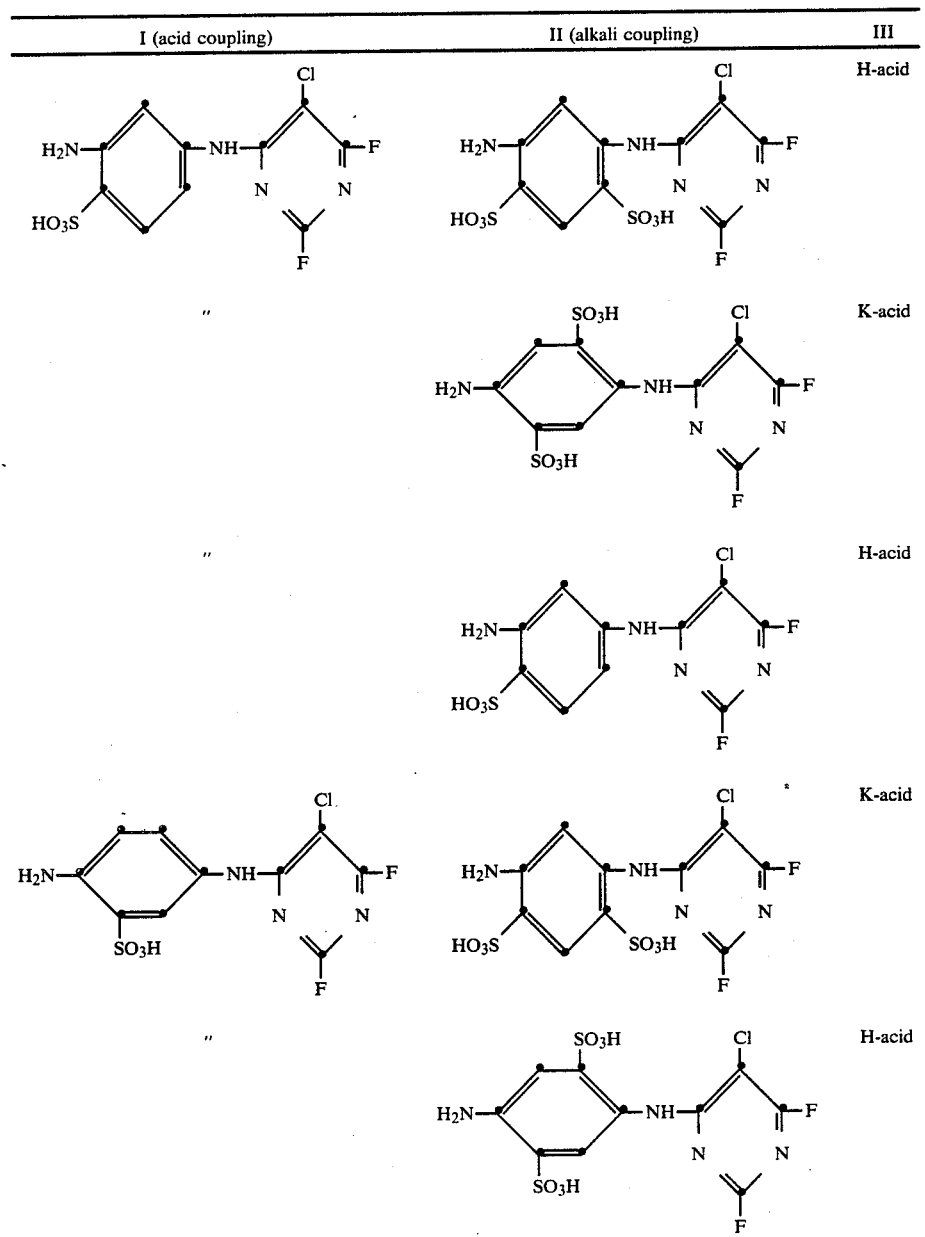

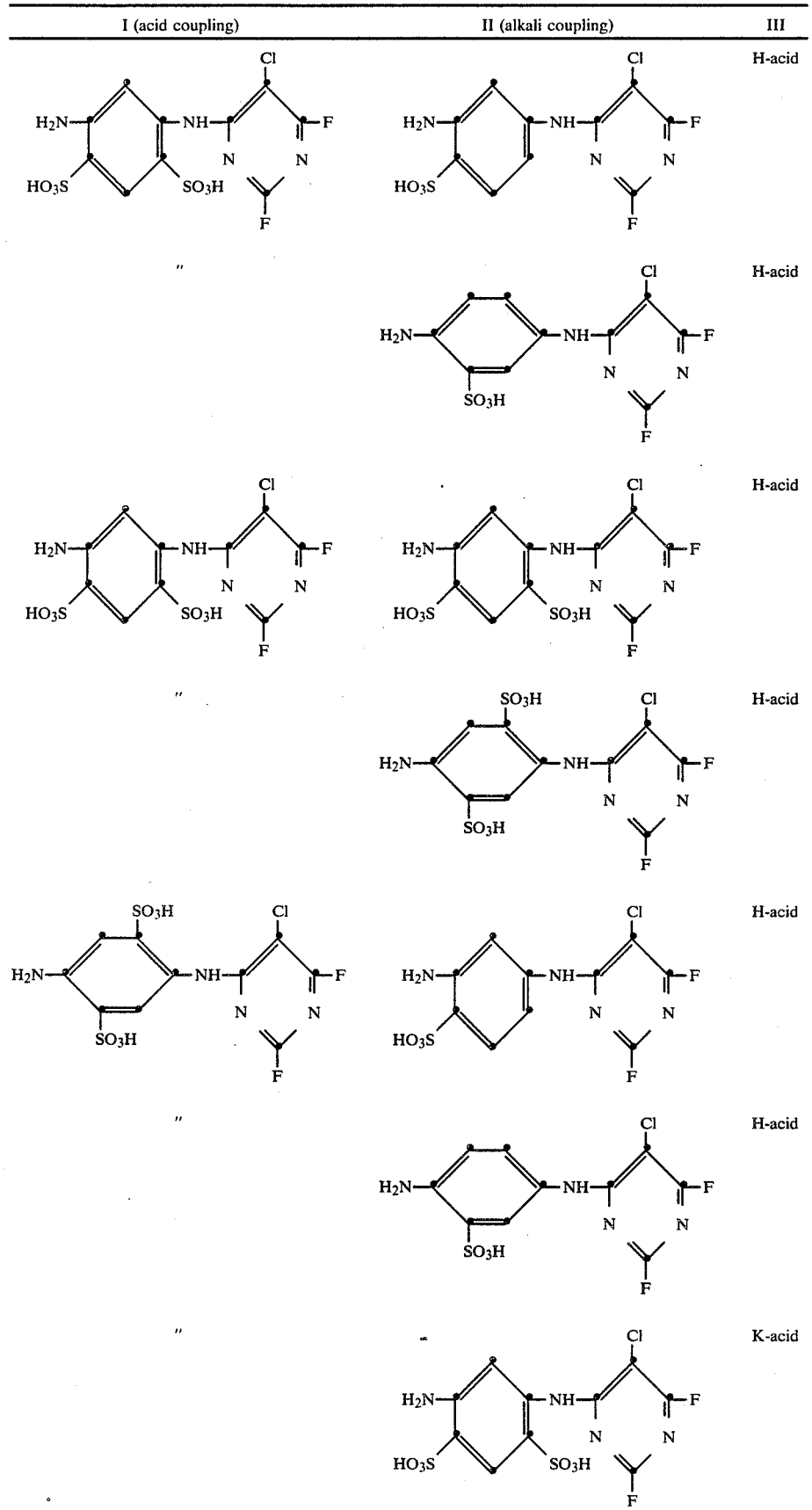

| I (acid coupling) | II (alkali coupling) | III |
|---|---|---|
| 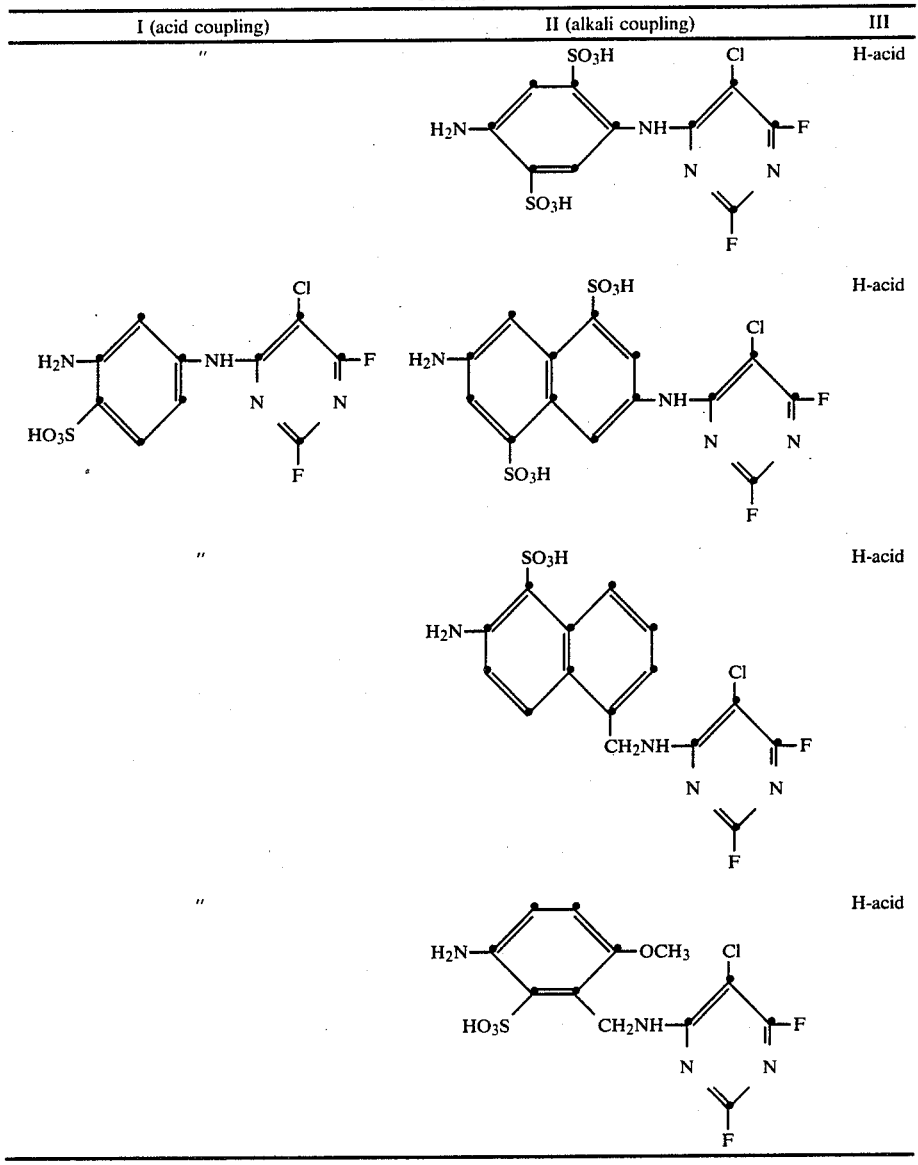 | | H-acid |
| | | H-acid |
| | | H-acid |
| | | H-acid |
| | | H-acid |

Dyeing method I 2 parts of the dye obtained in Example 1 are dissolved in 400 parts of water; to this solution are added 1500 parts of a solution which contains per liter 53 g of sodium chloride. 100 parts of a cotton fabric are introduced into this dyebath at 40° C. 45 minutes later, 100 parts of a solution which contains per liter 16 g of sodium hydroxide and 20 g of calcined sodium carbonate are added. The temperature of the dyebath is held at 40° C. for a further 45 minutes. The dyed fabric is then rinsed, soaped off at the boil with a non-ionic detergent for a quarter of an hour, is rinsed once more, and is dried.

Dyeing method II 2 parts of the reactive dye obtained in Example 1 are dissolved in 400 parts of water; to this solution are added 1500 parts of a solution which contains per liter 53 g of sodium chloride. 100 parts of a cotton fabric are introduced into this dyebath at 35° C. 20 minutes later 100 parts of a solution which contains per liter 16 g of sodium hydroxide and 20 g of calcined sodium bicarbonate are added. The temperature of the dyebath is held at 35° C. for a further 15 minutes. The temperature is then raised to 60° C. in the course of 20 minutes. The temperature is maintained at 60° C. for a further 35 minutes. The fabric is then rinsed, is soaped off at the boil with a non-ionic detergent for a quarter of an hour, is rinsed once more, and is dried.

Dyeing method III 4 parts of the reactive dye obtained in Example 1 are dissolved in 50 parts of water. To this solution are added 50 parts of a solution which contains per liter 5 g of sodium hydroxide and 20 g of calcined sodium carbonate. The resulting solution is used to pad-mangle a cotton fabric in such a way that its weight increases by 70%, and the fabric is then wound onto a beam. In this state the cotton fabric is left at room temperature for 3 hours. Afterwards the dyed fabric is rinsed, is soaped off at the boil with a non-ionic detergent for a quarter of an hour, is rinsed once more, and is dried.

Dyeing method IV 6 parts of the reactive dye obtained in Example 1 are dissolved in 50 parts of water. To this solution are added 50 parts of a solution which contains per liter 16 g of sodium hydroxide and 0.1 liter of sodium silicate. The resulting solution is used to pad-mangle a cotton fabric in such a way that its weight increases by 70%, and the fabric is then wound onto a beam. In this state the cotton fabric is left at room temperature for 10 hours. Afterwards the dyed fabric is rinsed, is soaped off at the boil with a non-ionic detergent for a quarter of an hour, is rinsed once more, and is dried.

Dyeing method V 2 parts of the reactive dye obtained in Example 1 are dissolved in 100 parts of water in the presence of 0.5 part of sodium m-nitrobenzenesulfonate. The resulting solution is used to impregnate a cotton fabric in such a way that its weight increases by 75%, and the fabric is then dried. The fabric is then impregnated with a warm solution at 20° C. which contains per liter 4 g of sodium hydroxide and 300 g of sodium chloride, and is squeezed off to give a weight increase of 75%, and the dyeing is steamed at 100° to 102° C. for 30 seconds, is rinsed, is soaped off in a 0.3% boiling solution of a non-ionic detergent for a quarter of an hour, is rinsed, and is dried.

Printing method 3 parts of the reactive dye obtained in Example 1 are sprinkled with high-speed stirring into 100 parts of a stock thickening containing 50 parts of 5% sodium alignate thickening, 27.8 parts of water, 20 parts of urea, 1 part of sodium m-nitrobenzenesulfonate and 1.2 parts of sodium hydrogencarbonate. The print paste thus obtained is used to print a cotton fabric, and the resulting printed fabric is dried and steamed at 102° C. in saturated steam for 2 minutes. The printed fabric is then rinsed, if desired soaped off at the boil and rinsed once more, and is then dried.

What is claimed is:

1. A reactive dye of the formula

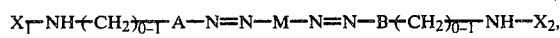

(1)

in which M is twice-coupled 1-amino-8-hydroxynaphthalene-3,6-disulfonic acid, 1-amino-8-hydroxynaphthalene-4,6-disulfonic acid, 1-amino-8-hydroxynaphthalene-4-sulfonic acid or 2-amino-5-hydroxynaphthalene-7-sulfonic acid, A and B, independently of each other, are each sulfophenylene or sulfonaphthylene which can be further substituted, and $X_1$ and $X_2$ are each a 2,4-difluoro-5-chloropyrimid-6-yl radical, subject to the condition that A and B together contain at least 3 sulfo groups.

2. A reactive dye according to claim 1 of the formula

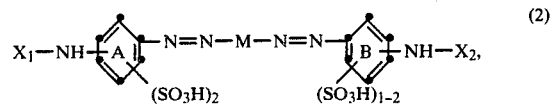

(2)

in which M, $X_1$ and $X_2$ are as defined in claim 1, and the benzene rings A and B, independently of each other, can be further substituted.

3. A reactive dye according to claim 2 in which the benzene rings A and B are not further substituted.

4. A reactive dye of the formula

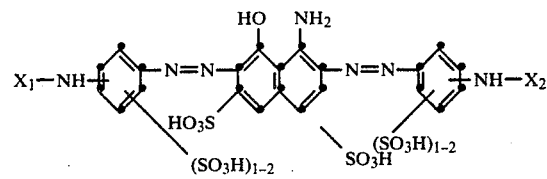

in which $X_1$ and $X_2$ are 2,4-difluoro-5-chloropyrimid-6-yl, and the total number of sulfo groups is 5 or 6.

5. A reactive dye according to claim 4 of the formula

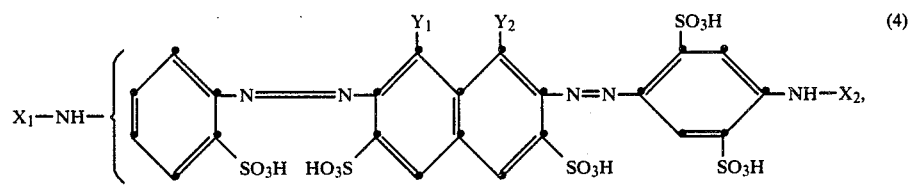

(4)

in which one Y is OH while the other Y is $NH_2$, and $X_1$ and $X_2$ are as defined for claim 4.

6. A reactive dye according to claim 5 of the formula

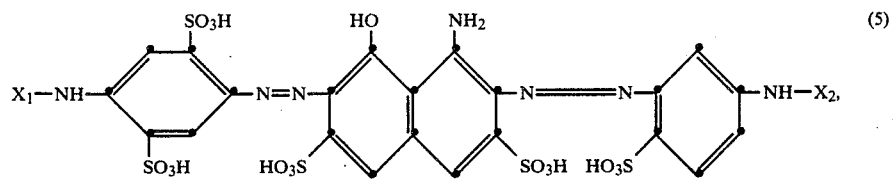

(5)

in which $X_1$ and $X_2$ are as defined for claim 5.

7. A process for preparing a reactive dye according to claim 1, which comprises reacting diazo components of the formulae $$H_2N-A+CH_2)_{0-1}Z_1 \quad (6)$$

and $$H_2N-B+CH_2)_{0-1}Z_2, \quad (7)$$

in which $Z_1$ and $Z_2$, independently of each other, are each $NH_2$, acetylamino or nitro, the coupling component 1-amino-8-hydroxynaphthalene-3,6-disulfonic acid, 1-amino-8-hydroxynaphthalene-4,6-disulfonic acid, 1-amino-8-hydroxynaphthalene-4-sulfonic acid or 2-amino-5-hydroxynaphthalene-7-sulfonic acid, and 2 equivalents of 2,4,6-trifluoro-5-chloropyrimidine by diazotising, coupling and condensing them in suitable order to give reactive dyes of the formula (1) in such a way that, if $Z_1$ or $Z_2$ is acetylamino or nitro, it is converted into the $NH_2$ group, by hydrolysis in the case of the acetylamino group or reduction in the case of the nitro group, before condensation with the halogenopyrimidine.

8. A process of dyeing or printing a cellulose-containing fiber material which comprises contacting said material with a reactive dye of claim 1.

9. A process according to claim 8 wherein said material is cotton.

* * * * *